(12) United States Patent
Namuduri et al.

(10) Patent No.: US 9,868,410 B2
(45) Date of Patent: Jan. 16, 2018

(54) APPARATUS AND METHOD FOR ELECTRICAL POWER MANAGEMENT IN A VEHICLE SYSTEM

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US); Venkata Prasad Atluri, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 14/672,313

(22) Filed: Mar. 30, 2015

(65) Prior Publication Data
US 2016/0288746 A1 Oct. 6, 2016

(51) Int. Cl.
*B60R 16/033* (2006.01)
*F02N 11/08* (2006.01)

(52) U.S. Cl.
CPC ............ *B60R 16/033* (2013.01); *F02N 11/08* (2013.01)

(58) Field of Classification Search
CPC ......... B60R 16/033; B60L 11/02; B60L 11/18
See application file for complete search history.

(56) References Cited

U.S. PATENT DOCUMENTS

| 5,539,286 A | 7/1996 | Brinkmeyer et al. |
| 9,431,180 B2* | 8/2016 | Winkler ................ B60L 3/0046 |
| 2011/0012424 A1* | 1/2011 | Wortberg .............. H02J 7/1423 307/10.1 |
| 2013/0175856 A1* | 7/2013 | Ojima ................... B60L 3/0023 307/9.1 |
| 2016/0137092 A1* | 5/2016 | Thieme ............... B60L 11/1861 307/10.6 |

FOREIGN PATENT DOCUMENTS

| CN | 101687480 A | 3/2010 |
| CN | 103260958 A | 8/2013 |
| CN | 103660954 A | 3/2014 |
| WO | 2009014041 A1 | 1/2009 |

* cited by examiner

*Primary Examiner* — Jeffrey Shin
(74) *Attorney, Agent, or Firm* — Quinn IP Law

(57) ABSTRACT

An electric power management system for a vehicle includes a first power bus arranged in parallel with a second power bus between first and second nodes. A third power bus couples a first battery and an auxiliary load at the second node. The second power bus couples a starter, a second battery and a generator at the first node, and selectively couples the first node to the second node when a first switch is activated. The second battery couples to the first node when a second switch is activated and the engine starter couples to the first node when a starter switch is activated. The second power bus couples the first node to the second node when a third switch is activated. A controller monitors states of charge of the first battery and the second battery and controls activations of the first switch, the second switch and the third switch.

18 Claims, 3 Drawing Sheets

APPARATUS AND METHOD FOR ELECTRICAL POWER MANAGEMENT IN A VEHICLE SYSTEM

TECHNICAL FIELD

The present disclosure relates to a powertrain for a vehicle, and an electric power management system associated therewith.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle may employ both an internal combustion engine and an electric generator to provide propulsion power, and may reduce fuel consumption and emissions. One type of hybrid electric vehicle is a belted-alternator-starter (BAS) system that includes a generator coupled to a crankshaft of the engine. Such systems include an independently operated starter motor to start the engine when the engine has been shut off for an extended period of time. The generator operates as a motor to generate torque to restart the engine after an autostop event during ongoing vehicle operation, and operates as a generator to convert engine and vehicle propulsion torque to electric power during engine operation and regenerative braking events.

SUMMARY

An electric power management system for supplying electric power in a vehicle includes a first power bus arranged electrically in parallel with a second power bus between first and second nodes. A third power bus electrically couples a first battery and an auxiliary load at the second node. The second power bus electrically couples an engine starter, a second battery and a generator at the first node, and selectively electrically couples the first node to the second node when a first switch is activated. The second battery electrically couples to the first node when a second switch is activated and the engine starter electrically couples to the first node when a starter switch is activated. The second power bus electrically couples the first node to the second node when a third switch is activated. A controller monitors states of charge of the first battery and the second battery and controls activations of the first switch, the second switch and the third switch in response to a preferred operating mode and the states of charge of the first battery and the second battery.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
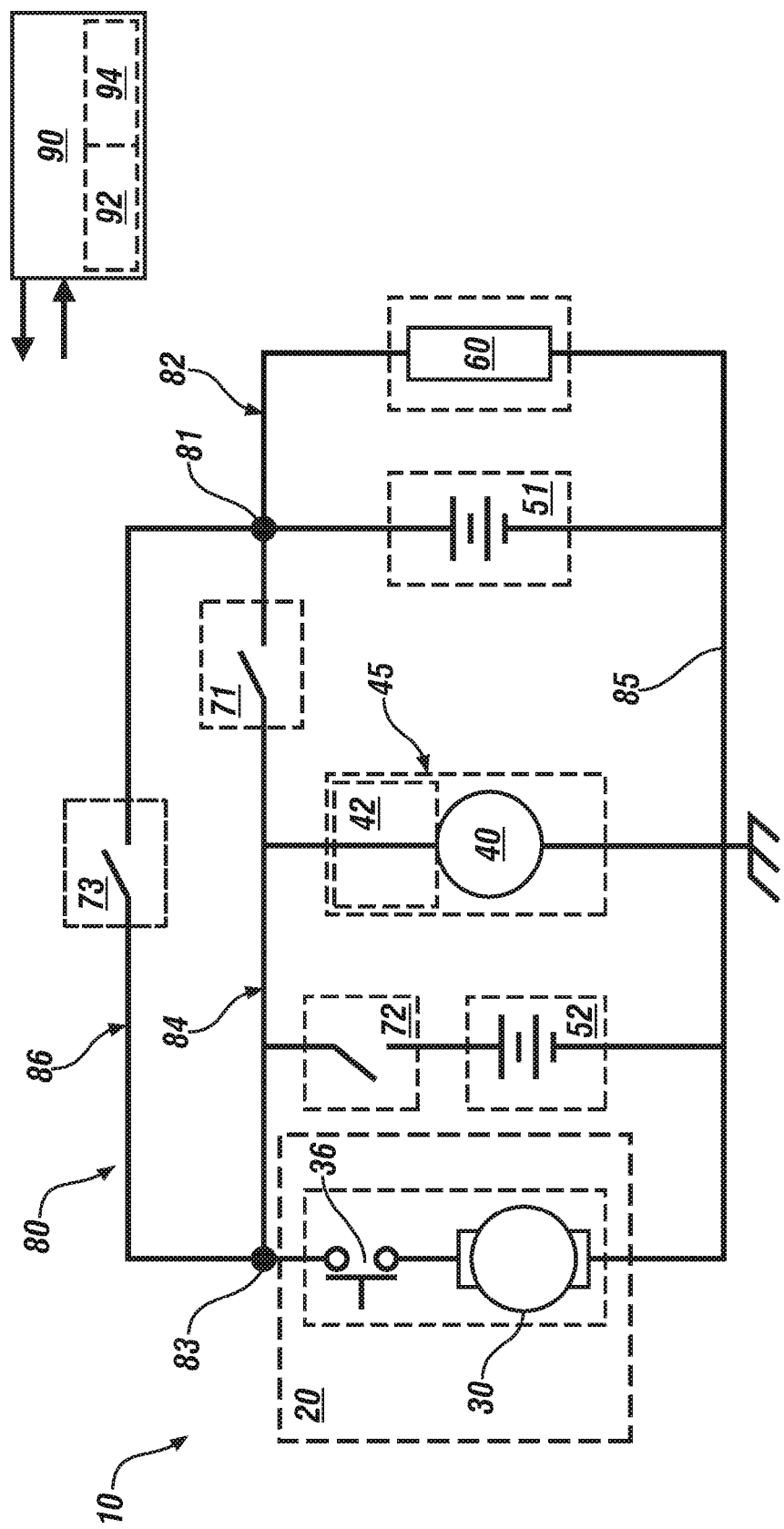
FIG. 1 schematically illustrates an electric power distribution system for a vehicle including a powertrain system that includes an internal combustion engine (engine), a starter and an electric generator, the operations of which are controlled by a controller, in accordance with the disclosure.

Referring now to the drawings, wherein the depictions are for the purpose of illustrating certain exemplary embodiments only and not for the purpose of limiting the same, FIG. 1 schematically illustrates an electric power distribution system 80 for a powertrain system 10 that includes an internal combustion engine (engine) 20, a starter 30 and an electric generator 40, the operations of which are controlled by a controller 90. Like numerals indicate like or corresponding parts throughout the several views.

The engine 20 may be any suitable internal combustion engine and mechanically couples through a gear train to transfer power in the form of torque and rotational speed to a driveline. The engine 20 includes the starter 30 that electrically connects to the electric power distribution system 80 via a controllable starter switch 36. The starter 30 may be any suitable engine starting device, and in one embodiment includes an electric motor rotatably coupled to a solenoid-activated pinion gear that meshingly engages a ring gear coupled to an engine crankshaft to effect rotation thereof in response to an engine starting command through activation of the starter switch 36.

The generator 40 includes an integrated inverter 42 and may be an alternating current (AC) generator or any other suitable generator. The generator 40 may convert mechanical power, e.g., engine torque, to electric power. For example, torque being outputted from the generator 40 may be in a range between 15.0 newton-meters (Nm) and 25.0 Nm, or another suitable range consistent with the system design and operating requirements. The generator 40 may be employed to generate electric power for recharging a first energy storage device (first ESD) 51 and/or a second energy storage device (second ESD) 52. Furthermore, electric power from the generator 40 may be deployed to power various auxiliary electrical devices referred to herein as the load 60. The load 60 may include, by way of example, HVAC devices, auxiliary electrical motors for cooling fans, pumps and the like, and entertainment system components, among others.

The first and second electrical energy storage devices (ESDs) 51, 52 may be any suitable electric power storage devices. The first ESD 51 may be a rechargeable lead-acid device supplying electric power at a nominal voltage of 12 Vdc to the electric power distribution system 80 in one embodiment. The second ESD 52 may be configured as an absorbent glass mat (AGM) device, a nickel-metal-hydride (NiMH) device or a lithium-ion (Li-Ion) device, or an ultra-capacitor that supplies electric power at or near the nominal voltage of 12 Vdc to the electric power distribution system 80. Other ESDs may be similarly employed. Preferably, the second ESD 52 has a charging voltage that is equivalent to or near the nominal operating voltage of the first ESD 51.

The electric power distribution system 80 electrically connects the starter 30, the generator 40, the first ESD 51, the second ESD 52 and the load 60, all of which are electrically arranged in parallel between a ground bus 85 and the electric power distribution system 80. The electric power distribution system 80 is fabricated from electric power cables, buses, connectors and other devices capable of transferring electric power at suitable voltage and current levels associated with operation of the specific application in which it is employed.

The electric power distribution system 80 includes a first power bus 82, a second power bus 84, and a third power bus 86. The second and third power buses 84, 86 electrically connect at a second node 83, and the first, second and third power buses 82, 84, 86 electrically connect at a first node 81. The electric power distribution system 80 also includes a plurality of switches including a first switch 71, a second switch 72 and a third switch 73, the activations of which are controllable by the controller 10.

The first power bus 82 electrically connects the first ESD 51 and the load 60, and may be employed as the primary 12 Vdc bus.

The second power bus 84 electrically connects between the first and second nodes 81, 83 and includes the first power switch 71 and the second power switch 72. The starter 30, the generator 40 and the second ESD 52 are electrically connectable to the second power bus 84. The first power switch 71 electrically connects the first node 81 to the second node 83 when in a closed, or activated state, and electrically disconnects the first node 81 from the second node 83 when in an open, or deactivated state. The starter 30 is electrically connectable to the first node 81 of the second power bus 84 by activation of the starter switch 36. The second ESD 52 is electrically connectable to the first node 81 of the second power bus 84 by activation of the second power switch 72, and is electrically disconnected from the first node 81 of the second power bus 84 by deactivation of the second power switch 72. The second power bus 84 electrically connects the second ESD 52 to the generator 40 when the second switch 72 is activated, electrically connects the second ESD 52 to the load 60 and the first ESD 51 when the first switch 71 and the second switch 72 are activated, and electrically connects the generator 40 to the load 60 and the first ESD 51 when the first switch 71 is activated. The starter 30 and the ignition switch 36 electrically connect through the second node 83 to the first ESD 51 when the first switch 71 is activated. The starter 30 and the ignition switch 36 electrically connect through the second node 83 to the second ESD 52 when the first switch 71 and the second switch 72 are activated.

The third power bus 86 electrically connects between the first and second nodes 81, 83 and includes the third switch 73. As such, the first node 81 electrically connects to the second node 83 via the third power bus 86 when the third power switch 73 is activated, i.e., closed, and the first node 81 electrically disconnects from the second node 83 via the third power bus 86 when the third switch 73 is deactivated, i.e., open. The third power bus 86 is arranged in parallel with the second power bus 84 between the first and second nodes 81, 83, and electrically connects the first and second nodes 81, 83 when the third switch 73 is activated.

The first, second and third switches 71, 72 and 73 are each low resistance devices, preferably having an activated or ON resistance of less than 0.5 mΩ. Each of the first, second and third switches 71, 72 and 73 may be a single device, or alternatively, may be composed of multiple devices arranged in parallel to achieve the ON resistance of less than 0.5 mΩ.

In one embodiment, the first, second and third switches 71, 72 and 73 are MOSFET devices. Each of the first, second and third switches 71, 72 and 73 includes a capability to block voltage in at least in one direction of current flow, employing, e.g., an anti-parallel diode. In one embodiment, the third switch 73 may be a high current electro-mechanical relay that is capable of carrying starter current during engine cranking. In one embodiment, the second switch 72 may be a solid-state switch with bidirectional blocking capability. In one embodiment, the second switch may be integrated into the second ESD 52. In one embodiment, the first switch 71 and/or the third switch 73 may be integrated into the first ESD 51. In one embodiment, the third switch 73 may be eliminated if the first switch 71 has been sized to handle the starter current.

The controller 90 may be an element of an electronic control module and preferably includes a non-volatile memory device 94 and a processor 92. The controller 90 monitors operator commands and signals from various components and executes algorithms to determine commands for various actuators including activation commands for each of the first, second and third switches 71, 72 and 73 and a generator voltage command 45. The term controller, and similar terms including, e.g., control module, module, control, control unit and processor refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and communications between controllers, actuators and/or sensors may be accomplished using a direct wired link, a networked communications bus link, a wireless link or any other suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Figure 2:
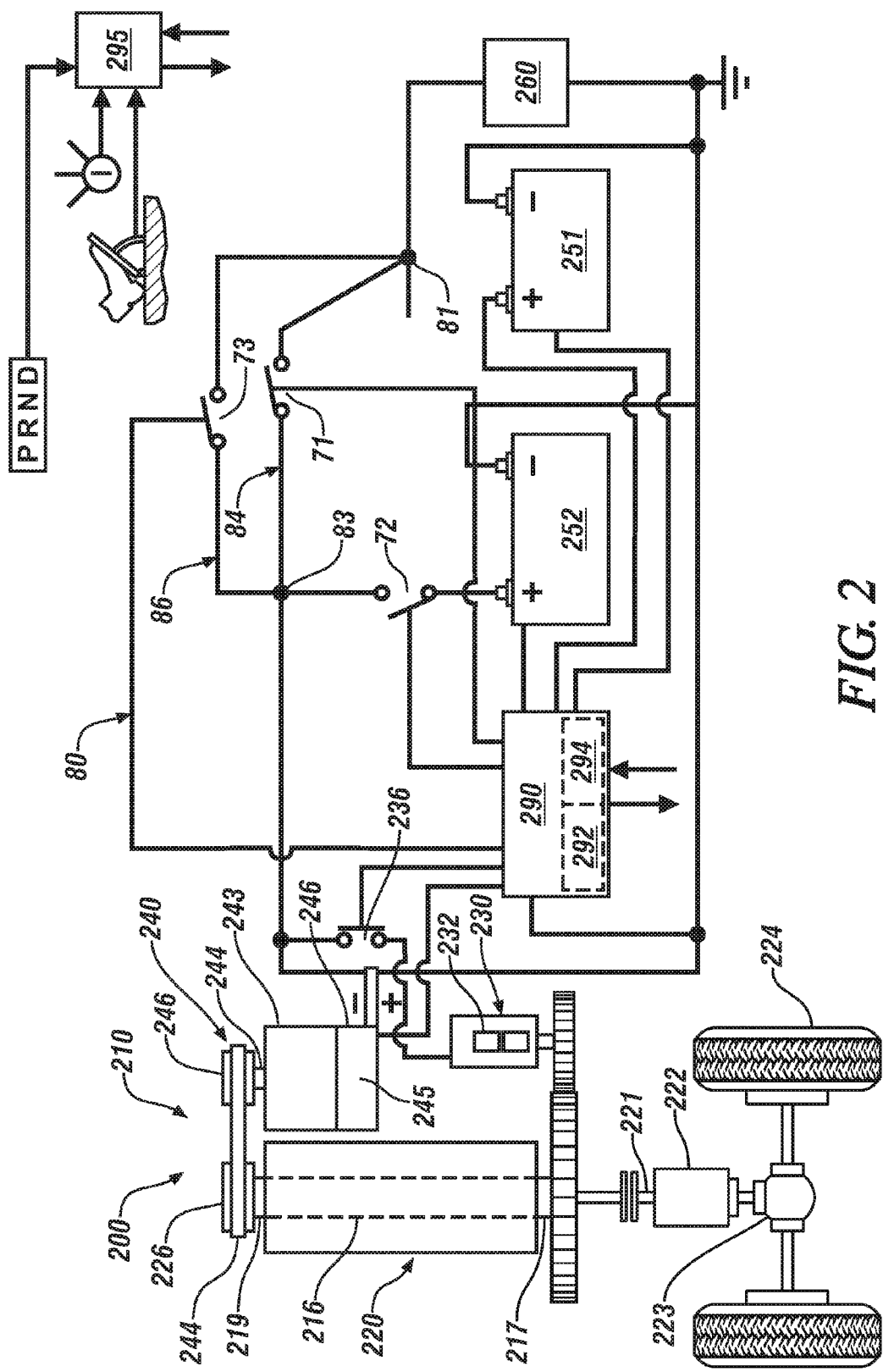
FIG. 2 schematically illustrates an embodiment of the electric power distribution system employed on an embodiment of a vehicle including a powertrain system, in accordance with the disclosure.

FIG. 2 schematically illustrates an embodiment of the electric power distribution system 80 employed on an embodiment of a vehicle 200 that includes a powertrain system 210. The powertrain system 210 includes an internal combustion engine (engine) 220 that rotatably couples to a starter 230 and an electric generator 240. The electric power distribution system 80 is analogous to the electric power distribution system 80 described with reference to FIG. 1 and includes multiple selectable electric energy flow paths to advantageously provide stabilized low-voltage electrical power throughout the vehicle 200 during various vehicle and powertrain operating modes, some of which are described herein with reference to FIG. 3 and Table 1. Vehicle and powertrain operating modes include, by way of example, cold engine cranking, engine auto-starting, engine auto-stopping, steady-state cruising, coasting including energy recuperation, opportunity charging, regenerative braking and other modes as described herein. The vehicle 200 may be a passenger car, truck or a non-automotive vehicle, such as a farm vehicle, a marine vehicle, an aviation vehicle, etc. Generally, the powertrain 200 includes the engine 220 and transmission 222 that mechanically couple to a final drive 223 to rotate wheels 224 to propel the vehicle 200.

The engine 220 may be an internal combustion engine that operates in any suitable configuration, e.g., spark-ignition, compression-ignition, or other. The engine 220 is preferably configured to execute engine autostop and auto-start routines during operation of the vehicle 200. Engine autostop includes routines that are executed to cause the engine 220 to achieve an OFF mode in which the engine 220 is unfueled, unfired and not spinning during vehicle operation, such as while the vehicle 200 is sitting at a stoplight. Engine autostart includes routines that are executed during ongoing powertrain operation to cause the engine 220 to achieve an ON mode in which the engine 220 is fueled, fired, spinning and preferably generating torque. The engine 220 includes a crankshaft 216 that is couplable to a first output member 217 on a first end of the engine 220 and is also couplable to a second output member 219 on a second, opposite end of the engine 220. The crankshaft 216 mechanically rotatably couples to a ring gear that rotatably couples to the starter 230 and to an input member 221 of the transmission 222 via the first output member 217. The transmission 222 may include any suitable gear train arrangement that may include one or more clutches through which torque may be transferred between the first output member 217 of the engine 220, the input member 221 of the transmission 222, and the final drive 223 to propel the vehicle 200 through the wheels 224. The wheels 224 may be front wheels and/or rear wheels of the vehicle 200. The crankshaft 216 of the engine 220 mechanically rotatably couples to a rotatable element 226 via the second output member 219. The rotatable element 226 may be a pulley, a sprocket, or another suitable device to transfer torque between the engine 220 and another device, e.g., electrical generator 240.

The generator 240 includes a stator 243 and rotor coupled to rotating shaft 244 that rotatably couples to a rotatable element 246. The rotatable element 246 couples to the engine 220 through the rotatable element 226 via an intervening belt, chain, or gear train. As such, the engine 220 is able to transfer torque to the generator 240 to generate electric power. The generator 240 may be employed as a generator to generate electric power for recharging a first energy storage device (first ESD) 251 and/or a second energy storage device (second ESD) 252. Furthermore, the generator 240 may operate in a regenerative braking mode to generate current during vehicle braking by reacting torque through the generator 240. Electric power from the generator 240 may be deployed to power various auxiliary devices of the vehicle 200 referred to herein as the load 260. The load 260 may include, by way of example, HVAC devices, auxiliary electrical motors for cooling fans, pumps and the like, and entertainment system components, among others.

The generator 240 may include an integrated power inverter 242 that controls electric power to the stator 243 in response to a generator voltage command 245 that may originate in a controller 290. The stator 243 can be in electrical communication with the integrated power inverter 242, and the integrated power inverter 242 can be selectively in electrical communication with the first and/or second ESDs 251, 252. The integrated power inverter 242 can convert AC electric power to DC electric power to be stored in the first and/or second ESDs 251, 252 when the generator 240 functions as the generator. Additionally, the integrated power inverter 242 can convert AC electric power to DC electric power to supply current to an auxiliary electric load 260. Also, the integrated power inverter 242 can convert AC electric power to DC electric power to selectively supply current to the first and/or second ESDs 251, 252. Generally, the integrated power inverter 242 can be in electrical communication with the stator 243 to operate the generator 240 as a motor or as a generator. The generator 240 may include other electrical devices, such as one or more sensors, e.g., a rotor position sensor that detects the position of the generator shaft 244, controllers, fans to cool electrical components, and sundry other components. Furthermore, the integrated power inverter 242 may include one or more brushes, one or more brush holders, and a field control electronic device when using a wound field machine. Alternatively, the generator 240 may employ any suitable device for converting AC electric power to DC electric power, e.g., a diode rectifier or an active bridge device with or without phase advance.

In one embodiment, the second ESD 252 is a high-voltage ESD, and the first ESD 251 is a low-voltage ESD that is in electrical communication with the auxiliary electric load 260. The second ESD 252 is employed to selectively supply current/voltage to the generator 240 and the first ESD 251 is employed to supply current/voltage to the auxiliary electric load 260. The first ESD 251 and the second ESD 252 may be any suitable ESD or other device that may store electrical energy for later use. One non-limiting example is that the second ESD 252 may be a 48 Vdc ESD and the first ESD 251 may be a 12 Vdc ESD. Another non-limiting example is the second ESD 252 may be a 24 to 48 Vdc multi-cell rechargeable lithium ion battery or an ultra-capacitor, while the first ESD 251 may be a 12 Vdc lead acid or lithium ion battery. As yet another example, the first and second ESDs 251, 252 may have substantially the same voltage levels. With a higher voltage ESD 252, a dc-dc converter shall be employed between the ESD 252 and ESD 251.

An operator interface device 295 includes one or a plurality of devices through which an operator commands operation of the vehicle 200 and powertrain system 210, including, e.g., an accelerator pedal, a brake pedal, an ignition key, a transmission range selector, cruise control, and other related devices. The operator interface device 295 preferably communicates with the controller 290 and may also directly connect to various elements, e.g., starter switch 236. The operator interface device 295 and/or the controller 290 generates commands to control operation of the vehicle 200 and the powertrain system 210, including, e.g., a powertrain ON/OFF state, a transmission range selection, e.g., one of Park, Reverse, Neutral and Drive, an operator torque request, an operator vehicle speed request, and other related commands. The operator interface device 295 is shown as a unitary device for ease of illustration.

The controller 290 includes a processor 292 and a memory device 294 on which is recorded instructions for communicating with the generator 240, a starting solenoid 232 controlling the starter 230, the first and/or second ESDs 251, 252, and the first, second and third switching devices 71, 72, and 73. The controller 290 executes the instructions from the memory device 294 via the processor 292 to control operation of the various elements of the powertrain system 210. The electric power management system 80 facilitates different operating modes, even if one of either the first ESD 251 or the second ESD 252 is unavailable. The engine 220 may be started from power provided from either the first ESD 251 or the second ESD 252.

Figure 3:
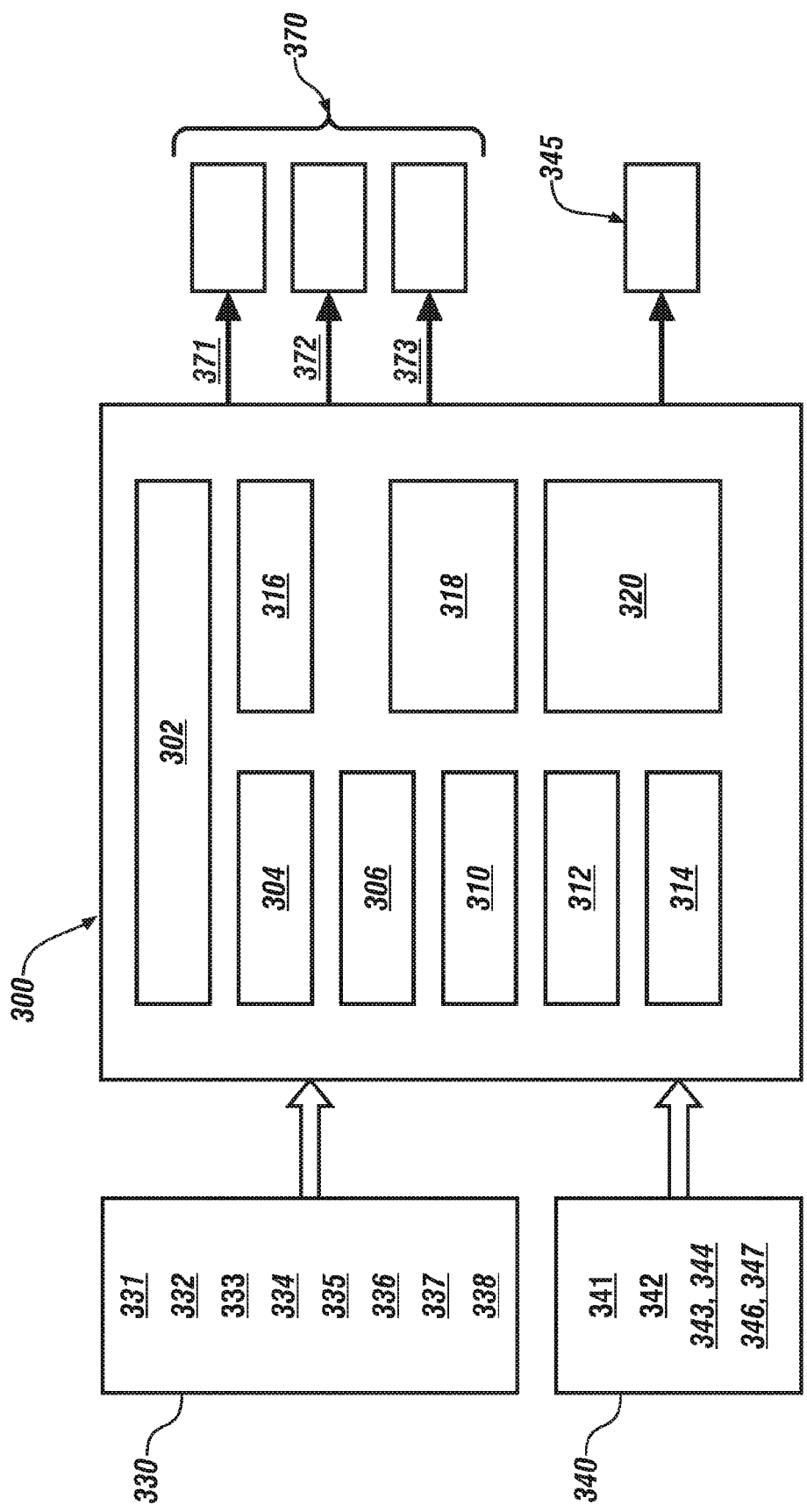
FIG. 3 schematically shows an overview of an executable control routine for monitoring operations and providing control commands to control operation of the electric power distribution system shown with reference to FIG. 1 for controlling operation of the vehicle shown with reference to FIG. 2, in accordance with the disclosure.

FIG. 3 schematically shows an overview of an executable control routine 300 for monitoring operations and providing control commands to control operation of the electric power distribution system 80 shown with reference to FIG. 1 to control operation of the vehicle 200 shown with reference to FIG. 2. Monitored operation includes monitoring, e.g., electric power flow (current and voltage), ESD states-of-charge, load power demands, ambient conditions and operator requests for propulsion power and other forms of power.

Execution of the control routine 300 includes monitoring vehicle states 330 and battery states 340, both of which are employed by the control routine 300 to identify one of a plurality of operating modes. The control routine 300 selects preferred activation states 370 including activation states 371, 372, 373 associated with the first, second and third switches 71, 72 and 73, respectively of the electric power distribution system 80 and a preferred generator voltage set point 345 for commanding operation of the generator 240. Each of the preferred activation states 371, 372, 373 includes an ON or activated state and an OFF or deactivated state.

The monitored vehicle states 330 include, by way of example, a vehicle wake-up command 331, an engine crank/run command 332, an accelerator pedal command 333, which may be analogous to an operator request for tractive torque, a brake pedal command 334, a road grade indicator 335, signal inputs from one or a plurality of extra-vehicle proximity sensors 336, and signal inputs from one or a plurality of ambient temperature sensors 337 and component temperature sensors 338. Other vehicle states may be similarly employed. Each of the vehicle states 330 may be directly monitored via one or more on-vehicle sensing devices, inferred from monitoring via related on-vehicle sensors, dynamically modeled, or otherwise determined.

The monitored battery states preferably include a state of charge of ESD1 51 (SOC1) 341, a state of charge of ESD2 52 (SOC2) 342, voltage of ESD1 51 (Vbat1) 343, voltage of ESD1 52 (Vbat2) 344, current of ESD1 51 (Ibat1) 346 and current of ESD1 52 (Ibat2) 347.

The operating modes include a system initialization mode 302, a key start mode 304, an engine idling mode 306, an engine autostop/autostart mode 310, a vehicle acceleration mode 312, a vehicle steady-state cruising mode (Vehicle Cruise) 314, an opportunity charging mode 316, a coasting-charging (DFCO) mode 318, and a disabled mode 320. Each of the operating modes is described herein.

Table 1 shows a plurality of operating modes and associated switch states for operating an embodiment of the vehicle 200 including powertrain system 210. Switches include the first switch (S1) 71, second switch (S2) 72 and third switch (S3) 73, each capable of an ON or activated state (1) and an OFF or deactivated state (0).

TABLE 1

| Operating Mode | ESD 1 SOC | ESD 2 SOC | S1 State | S2 State | S3 State |
| --- | --- | --- | --- | --- | --- |
| Key Start | — | — | 0 | 0 | 1 |
| Engine Idling | > Limit | — | 0 | 0 | 0 |
| Engine Idling | < Limit | — | 1 | 0 | 0 |
| Vehicle Acceleration | >Limit | — | 0 | 0 | 0 |
| Vehicle Acceleration | <Limit | — | 1 | 0 | 0 |
| Vehicle Cruise | >Limit | — | 1 | 0 | 0 |
| Vehicle Cruise | <Limit | — | 1 | 0 | 0 |
| Opportunity Charge | >=Limit | >=Limit | 0 | 0 | 0 |
| Opportunity Charge | <Limit | >=Limit | 1 | 0 | 0 |
| Opportunity Charge | >=Limit | <Limit | 0 | 1 | 0 |
| Opportunity Charge | <Limit | <Limit | 1 | 1 | 0 |
| DFCO | >=Limit | >=Limit | 0 | 0 | 0 |
| DFCO | <Limit | >=Limit | 1 | 0 | 0 |
| DFCO | >=Limit | <Limit | 0 | 1 | 0 |
| DFCO | <Limit | <Limit | 1 | 1 | 0 |
| Engine Autostop | >Limit | — | 0 | 0 | 0 |
| Engine Autostop (engine restart) | <Limit | — | 1 | 0 | 0 |
| Engine Autostop (engine restart) | — | <Limit | 0 | 1 | 0 |
| Engine Autostart | — | >limit | 0 | 1 | 0 |
| Engine Autostart | — | <Limit | 1 | 0 | 1 |
| Disabled | — | — | 1 | 0 | 0 |

The key start mode 304 may be commanded during cold cranking to initially start the engine 220 in response to an operator key-on command. The engine 220 may be cold or warmed up from recent operation. When the vehicle ignition is in a key-off state, the first ESD 251 remains connected to the first power bus 82 and is subjected to low parasitic currents. When the vehicle ignition is turned ON, e.g., in response to an operator key-on command, switch S3 73 is activated (1) to initiate engine start event. Switches S1 71 and S2 72 are kept open, i.e., deactivated (0). When the cold crank event completes, switch S3 73 remains activated unless the second ESD 252 becomes unavailable or the operating temperature is low, for example less than 0° C. When the operating temperature increases to be greater than a predetermined threshold, for example 10° C., switch S3 73 remains activated unless the second ESD 252 becomes unavailable and an engine restart is requested.

The engine idling mode 306 may be commanded when the engine 220 is idling, i.e., when there is no operator input to an accelerator pedal. This includes activating the switch S1 71 for a pre-determined period of time to replenish any electrical charge of the first ESD 251 that may have been depleted during the key start mode 304, after which switch S1 71 is deactivated so that the first ESD 251 supplies electric power to the auxiliary electric load 260. The generator excitation signal 245 is adjusted to maintain the generator output voltage sufficiently low so that the first ESD 251 supplies electric power to meet the electrical load demands of the auxiliary electric load 260. When the state of charge of the first ESD 251 (SOC1) reaches a pre-determined low threshold (<Limit), switch S1 71 is closed, i.e., is activated to charge the first ESD 251 and the generator excitation signal 245 is adjusted to charge the first ESD 251, and switches S2 72 and S3 73 remain open, i.e., deactivated. Otherwise, switches S1 71, S2 72 and S3 73 remain open during the idling mode 306.

The vehicle acceleration mode 312 may be commanded when the vehicle 200 is accelerating, and includes adjusting the generator excitation signal 245 to achieve a low generator output voltage so that the auxiliary electric load 260 is supplied by the first ESD 251 or the second ESD 252 or both, depending on their respective SOC levels without loading the engine 220 through the generator 240. Adjusting the generator excitation includes reducing the generator voltage command 245 to minimize the generator excitation, and thus minimizing load on the engine 220 from the generator 240 to permit all engine power to be employed in vehicle acceleration. When the state of charge of the first ESD 251 (SOC1) reaches a pre-determined low threshold (<Limit), switch S1 71 is closed, i.e., is activated to charge the first ESD 251 and the generator excitation signal 245 is adjusted to charge the first ESD 251, and switches S2 72 and S3 73 remain open, i.e., deactivated. Otherwise, switches S1 71, S2 72 and S3 73 remain open during the vehicle acceleration mode 312.

The vehicle cruising mode 314 may be commanded when the vehicle 200 is operating under normal driving conditions with minimal road loads, and includes adjusting the generator voltage command 245 to keep its output voltage low so that the electrical loads will be supplied by the first ESD 251 and/or the second ESD 252 or both, depending on their respective SOC1, SOC2, without loading the engine 220 through the generator 240. The vehicle cruising mode 314 may include low-load engine operation to maintain speed of the vehicle 200 at or near a constant level while the vehicle 200 is operating on a flat or reasonably flat road surface. Adjusting the generator voltage command 245 includes reducing the generator voltage command 245 to minimize generator excitation, and thus minimize load on the engine 220 unless needed to increase either SOC1 or SOC2. If either SOC1 or SOC2 is below their respective predetermined low or minimum thresholds (<Limit), then the generator 40 supplies electric power to the auxiliary electric load 260 and also charges the first ESD 251. By way of example, SOC1 is preferably maintained within a narrow range, e.g., 85-90% of a maximum SOC for the first ESD 251 when it is a lead-acid battery configuration. By way of example, SOC2 is preferably maintained within a wider range, e.g., 40-80% when the second ESD 252 is a NiMH or other related battery configuration. When the state of charge of the first ESD 251 (SOC1) reaches a pre-determined low or minimum threshold (<Limit), switch S1 71 is closed, i.e., is activated to charge the first ESD 251 and the generator excitation signal 245 is adjusted to charge the first ESD 251, and switches S2 72 and S3 73 remain open, i.e., deactivated. Otherwise, switches S1 71, S2 72 and S3 73 remain open during the vehicle cruising mode 314.

The opportunity charging mode 316 may be commanded when the vehicle 200 is cruising at or near a steady-state speed, when there may be opportunity to operate the engine 220 at a preferred speed/load operating point that achieves greater engine and fuel efficiency. The preferred speed/load operating point may be achieved by loading the generator 230, and hence increase the torque output from the engine 220. This is one example of an opportunity charging mode. The engine efficiency points are determined based upon specific fuel consumption points of the engine 220, which may be determined during engine development. The additional current produced by the generator 240 may be used for charging either the first ESD 251 or the second ESD 252, as permitted by their respective SOC limits so as to avoid overcharging.

When the state of charge of the first ESD 251 (SOC1) is greater than its low threshold (>=Limit) and a state of charge of the second ESD 252 (SOC2) is greater or equal to than its low threshold (>=Limit), switches S1, S2 72 and S3 73 remain open, i.e., deactivated.

When the state of charge of the first ESD 251 (SOC1) is less than its low threshold (<Limit) and the state of charge of the second ESD 252 (SOC2) is greater or equal to than its low threshold (>=Limit), switch S1 71 is closed, i.e., is activated to charge the first ESD 251 and the generator excitation signal 245 is adjusted to charge the first ESD 251, and switches S2 72 and S3 73 remain open, i.e., deactivated.

When the state of charge of the first ESD 251 (SOC1) is greater than or equal to its low threshold (>=Limit) and the state of charge of the second ESD 252 (SOC2) is less than its low threshold (<Limit), switch S2 72 is closed, i.e., is activated to charge the second ESD 252 and the generator excitation signal 245 is adjusted, and switches S1 71 and S3 73 remain open, i.e., deactivated.

When the state of charge of the first ESD 251 (SOC1) is less than its low threshold (<Limit) and the state of charge of the second ESD 252 (SOC2) is less than its low threshold (<Limit), switches S1 71 and S2 72 are closed, i.e., are activated to charge the first ESD 251 and the second ESD 252 and the generator excitation signal 245 is adjusted, and switch S3 73 remains open, i.e., deactivated.

The DFCO mode 318 may be commanded when the vehicle 200 is coasting, e.g., when the vehicle 200 is moving and the operator has removed their foot from the accelerator pedal. The DFCO mode includes recuperating electrical energy through the engine 220 and driveline. Recuperating electrical energy may include increasing and maximizing generator output current by varying the field excitation in the generator 240, i.e., varying the generator voltage command 245. Under such operation, the generator 240 supplies current to electrical loads of the auxiliary electric load 260 and may also charge ESD1 251 and ESD2 252. When SOC1 and SOC2 are within permissible limits, both switch S1 71 and switch S2 72 are kept closed, i.e. activated. The switch S2 72 may operate in a linear mode if the internal voltages of first ESD 251 and second ESD 252 are not balanced within an acceptable level. When SOC1 associated with the first ESD 251 is greater than its upper limit, for example 90%, switch S1 71 may be opened, i.e., deactivated to prevent excessive charging of the first ESD 251. When SOC2 associated with the second ESD 252 is greater than its upper limit, switch S2 72 is open to prevent excessive charging of the second ESD 252.

The engine autostop/autostart mode 310 is commanded when the vehicle 200 executes an autostop routine to stop rotation of the engine 220, such as when the vehicle 200 is stopped at a traffic light. During operation in the autostop mode, the first ESD 251 supplies the electrical power to the auxiliary electric load 260 when its SOC is greater than a first limit (>limit). If the SOC1 falls below a predetermined low threshold, the second ESD 252 supplies the electrical load and charges the first ESD 251. Switch S2 72 may need to operate in a linear mode if the two ESD voltages are not balanced. If SOC1 and SOC2 fall below their respective predetermined low threshold limits (<limit), the vehicle 200 exits the autostop mode and executes an autostart routine to restart the engine 220.

The engine autostart mode 310 is commanded when the vehicle 200 executes an autostart routine to start the engine 220, including using the second ESD 252 to supply electric power to start the engine 220. During autostart, switch S1 71 is open, i.e., deactivated and the auxiliary electric load 260 is supplied electric power originating from the first ESD 251. This configuration provides a stabilized DC bus voltage for the auxiliary electric load 260.

Under some operating conditions, the second ESD 252 may be unavailable (B2 Disabled Mode) such as when a fault occurs. Under such conditions when the second ESD 252 is unavailable, switch S2 72 is kept open, i.e., deactivated, and the autostop/autostart mode 310 is disabled. This operation continues until the second ESD 252 becomes available or is replaced. Operating the vehicle 200 with the second ESD 252 unavailable includes keeping switch S1 71 closed, i.e., activated, and operating the vehicle 100 with the autostop/autostart functions disabled and with limited energy recuperation capability.

Operating an embodiment of the vehicle 200 with the electric power distribution system 80 and the executable control routine 300 enables the vehicle 200 to operate with a 12 Vdc autostop/autostart system that may execute coasting energy recuperation and opportunity charging to reduce fuel consumption while maintaining a stabilized 12V dc bus voltage at the vehicle electrical loads, thus eliminating lamp flicker and false fault detection during engine autostart events.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electric power management system for supplying electric power in a vehicle including an internal combustion engine and a generator, comprising:
   a first power bus arranged electrically in parallel with a second power bus between first and second nodes;
   a third power bus electrically coupling a first battery and an auxiliary load at the second node;
   the second power bus electrically coupling an engine starter, a second battery and a generator at the first node, and selectively electrically coupling the first node to the second node when a first switch is activated, wherein the second battery electrically couples to the first node when a second switch is activated and wherein the engine starter electrically couples to the first node when a starter switch is activated;
   the second power bus electrically coupling the first node to the second node when a third switch is activated;
   a controller monitoring states of charge of the first battery and the second battery; and
   the controller controlling the activations of the first switch, the second switch and the third switch in response to a preferred operating mode and the states of charge of the first battery and the second battery.

2. The electric power management system of claim 1, wherein the controller controlling the activations of the first switch, the second switch and the third switch in response to a preferred powertrain operating mode comprises the controller activating the third switch and deactivating the first and second switches during a cold engine cranking event.

3. The electric power management system of claim 1, wherein the controller controlling the activations of the first switch, the second switch and the third switch in response to a preferred powertrain operating mode comprises the controller activating the first switch and deactivating the second and third switches during engine idling when the state of charge of the first battery is less than a minimum threshold state of charge.

4. The electric power management system of claim 1, wherein the controller controlling the activations of the first switch, the second switch and the third switch in response to a preferred powertrain operating mode comprises the controller deactivating the first, second and third switches during vehicle acceleration when the state of charge of the first battery is greater than a minimum threshold state of charge.

5. The electric power management system of claim 4, wherein the controller controlling the activations of the first switch, the second switch and the third switch in response to a preferred powertrain operating mode comprises the controller activating the first switch and deactivating the second and third switches during vehicle acceleration only when the state of charge of the first battery is less than the minimum threshold state of charge.

6. The electric power management system of claim 1, wherein the controller controlling the activations of the first switch, the second switch and the third switch in response to a preferred powertrain operating mode comprises the controller activating the first switch and deactivating the second and third switches during vehicle cruising.

7. The electric power management system of claim 1, wherein the controller controlling the activations of the first switch, the second switch and the third switch in response to a preferred powertrain operating mode comprises the controller activating the first switch and deactivating the second and third switches during an opportunity charging mode when the state of charge of the first battery is less than a first minimum threshold state of charge and the state of charge of the second battery is greater than a second minimum threshold state of charge.

8. The electric power management system of claim 1, wherein the controller controlling the activations of the first switch, the second switch and the third switch in response to a preferred powertrain operating mode comprises the controller activating the second switch and deactivating the first and third switches during an opportunity charging mode when the state of charge of the first battery is greater than a first minimum threshold state of charge and the state of charge of the second battery is less than a second minimum threshold state of charge.

9. The electric power management system of claim 1, wherein the controller controlling the activations of the first switch, the second switch and the third switch in response to a preferred powertrain operating mode comprises the controller deactivating the third switch and activating the first and second switches during an opportunity charging mode when the state of charge of the first battery is less than a first minimum threshold state of charge and the state of charge of the second battery is less than a second minimum threshold state of charge.

10. The electric power management system of claim 1, wherein the controller controlling the activations of the first switch, the second switch and the third switch in response to a preferred powertrain operating mode comprises the controller activating the first switch and deactivating the second and third switches during a coasting-charging mode when the state of charge of the first battery is less than a first minimum threshold state of charge and the state of charge of the second battery is greater than a second minimum threshold state of charge.

11. The electric power management system of claim 1, wherein the controller controlling the activations of the first switch, the second switch and the third switch in response to a preferred powertrain operating mode comprises the controller activating the second switch and deactivating the first and third switches during a coasting-charging mode when the state of charge of the first battery is greater than a first minimum threshold state of charge and the state of charge of the second battery is less than a second minimum threshold state of charge.

12. The electric power management system of claim 1, wherein the controller controlling the activations of the first switch, the second switch and the third switch in response to a preferred powertrain operating mode comprises the controller deactivating the third switch and activating the first and second switches during a coasting-charging mode when the state of charge of the first battery is less than a first minimum threshold state of charge and the state of charge of the second battery is less than a second minimum threshold state of charge.

13. The electric power management system of claim 1, wherein the controller controlling the activations of the first switch, the second switch and the third switch in response to a preferred powertrain operating mode comprises the controller activating the second switch and deactivating the first and third switches during an autostart mode when a state of charge of the second battery is greater than a second minimum threshold state of charge.

14. The electric power management system of claim 1, wherein the controller controlling the activations of the first switch, the second switch and the third switch in response to a preferred powertrain operating mode comprises the controller activating the first switch and deactivating the second and third switches during an autostop mode when a state of charge of the first battery is greater than a second minimum threshold state of charge.

15. The electric power management system of claim 1, wherein the controller controlling the activations of the first switch, the second switch and the third switch in response to a preferred powertrain operating mode comprises the controller activating the first switch and deactivating the second and third switches when a fault associated with the second battery is detected.

16. The electric power management system of claim 1, wherein a nominal voltage of the first battery is equivalent to a charging voltage of the second battery.

17. An electric power circuit for a vehicle, comprising:
an internal combustion engine rotatably coupled to a generator and a starter; and
an electric power management circuit including:
a first energy storage device (first ESD), a second energy storage device (second ESD) and the generator arranged to supply electric power to an electrical load of the vehicle;
the first ESD electrically connected to the electrical load;
the generator electrically connectable to the first ESD and the electrical load via a first electric power switch;
the second ESD electrically connectable to the generator via a second power switch, and electrically connectable to the first ESD and the electrical load via the first electric power switch and the second electric power switch;
the starter electrically connectable to the first ESD via an ignition switch and a third power switch;
the starter electrically connectable to the second ESD via the ignition switch and the second power switch; and
a controller, executing a power management control routine to control activations of the first, second and third power switches and the ignition switch.

18. The electric power circuit of claim 17, wherein the first ESD, second ESD and the generator are arranged electrically in parallel to supply electric power to the electrical load of the vehicle.

* * * * *